United States Patent
Kimura (10) Patent No.: US 8,199,629 B2
(45) Date of Patent: Jun. 12, 2012

(54) OBJECTIVE LENS FOR OPTICAL PICKUP DEVICE, AND OPTICAL PICKUP DEVICE

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 35 days.

(21) Appl. No.: 12/597,157

(22) PCT Filed: Apr. 11, 2008

(86) PCT No.: PCT/JP2008/057172
§ 371 (c)(1),
(2), (4) Date: Oct. 22, 2009

(87) PCT Pub. No.: WO2008/136254
PCT Pub. Date: Nov. 13, 2008

(65) Prior Publication Data
US 2010/0128592 A1 May 27, 2010

(30) Foreign Application Priority Data
Apr. 27, 2007 (JP) ................. 2007-118062

(51) Int. Cl.
*G11B 7/135* (2012.01)
(52) U.S. Cl. ............................... 369/112.23
(58) Field of Classification Search .............. None
See application file for complete search history.

(56) References Cited

U.S. PATENT DOCUMENTS

2004/0213131 A1* 10/2004 Kimura et al. ........... 369/112.03
2005/0254399 A1* 11/2005 Kimura .................. 369/112.23
2006/0002279 A1* 1/2006 Okamura ................ 369/112.23

FOREIGN PATENT DOCUMENTS

| EP | 1 544 652 | 6/2005 |
|----|-----------|--------|
| JP | 2001-195769 | 7/2001 |
| JP | 2004-101932 | 4/2004 |
| JP | 2004-145907 | 5/2004 |
| JP | 2004-252135 | 9/2004 |

OTHER PUBLICATIONS

Search Report dated Apr. 28, 2010 issued for the corresponding European Patent Application No. 08740269.9.

* cited by examiner

*Primary Examiner* — Christopher R Lamb
(74) *Attorney, Agent, or Firm* — Cozen O'Connor (57) ABSTRACT

There are provided an objective lens for an optical pickup device which can record and/or reproduce information on/from an optical disk with high density with the use of a light flux with a short wavelength while keeping a temperature characteristic to be satisfactory in spite of having a plastic objective lens, and the optical pickup device. The objective lens suppresses generation of a spherical aberration even if a temperature change arises, by sacrificing wavelength characteristics and by enhancing temperature characteristics. Such satisfactory temperature characteristics can be acquired by the ring-shaped structure formed as a turning structure on an optical surface of the objective lens, in which the ring-shaped structure includes ring-shaped zones whose number is 3 or more and 30 or less and the ring-shaped structure is formed such that adjoining ring-shaped zones cause a predetermined optical path difference for an incident light flux.

10 Claims, 3 Drawing Sheets

000# OBJECTIVE LENS FOR OPTICAL PICKUP DEVICE, AND OPTICAL PICKUP DEVICE

RELATED APPLICATIONS

This is a U.S. National Phase Application under 35 U.S.C. 371 of International Application PCT/JP2008/057172, filed on Apr. 11, 2008.

This application claims the priority of Japanese Application No. 2007-118062 filed on Apr. 27, 2007, the entire content of which is hereby incorporated by reference.

TECHNICAL FIELD

The present invention relates to an objective lens to be used for an optical pickup device that is capable of high-density recording and/or reproducing of information for an optical disc by using a light flux with a short wavelength, and relates to the optical pickup device.

BACKGROUND ART

In recent years, research and development of a high density optical disc system capable of recording and/or reproducing information by using a violet semiconductor laser with a wavelength of about 400 nm, are advancing rapidly. As an example, in the case of an optical disc on which information is recorded and/or reproduced under the specifications that NA is 0.85 and a light source wavelength is 405 nm, namely, in the case of the so-called Blu-ray Disc (hereinafter referred to as BD), it is possible to record information of about 25 GB per layer for an optical disc having a diameter of 12 cm.

In an optical pickup device that can record and/or reproduce information on the BD, an objective lens is made with glass or an objective lens is made with plastics. An objective lens made with glass is not suitable for mass production and it tends to be high in cost, though it can exhibit stable optical characteristics in general. In contrast to this, an objective lens made with plastics has its merits that it is suitable for mass production through injection molding, and it makes cost reduction to be possible in general, with only one problem that temperature characteristics are relatively poor. The temperature characteristics mean a level of an amount of aberration generated in a light flux passing through an objective lens according to the ambient temperature change. The temperature characteristics can be improved by adding a ring-shaped structure like a diffractive structure on an optical surface, but wavelength characteristics are worsened in many cases, instead. The wavelength characteristics mean a level of an amount of aberration generated in a light flux passing through an objective lens according to a wavelength change of a light flux emitted from a light source.

For the background mentioned above, Patent Literature 1 discloses an objective lens made with plastics with NA of 0.85 wherein an amount of correcting the temperature characteristics by a ring-shaped structure is reduced by shortening a focal length, and thereby, both of the temperature characteristics and the wavelength characteristics are improved.

Patent Literature 1: JP-A No. 2004-252135

DISCLOSURE OF INVENTION

Technical Problem

However, the objective lens disclosed in the aforesaid Patent Literature 1 has a problem that it easily interacts with an optical disc because its back focus is small, and that it restricts optical pickup devices to be suitably used with the objective lens.

On the other hand, the objective lens made with plastics disclosed in the aforesaid Patent Literature 1 as a comparative example has a sufficiently secured working distance, but it employs a diffractive structure of blaze type as a ring-shaped structure. Because of a large number of ring-shaped zones and of a small width of each ring-shaped zone, it causes a problem that light utilization efficiency of the objective lens is lowered by errors in shapes caused when a mold is processed and by defective transfer caused when the lens is molded.

A spherical aberration caused by a temperature change grows greater with an ambient temperature change, in the operation of an optical pickup device. Therefore, as for an optical pickup device employing an objective lens exhibiting poor temperature characteristics, it is possible to consider the provision of an active correcting mechanism that monitors a temperature in the circumference of the objective lens and a spherical aberration that grows greater in accordance with temperature changes in the operation of the optical pickup device, and feeds back the results of the monitoring to the correcting mechanism for a spherical aberration. However, the active correcting mechanism is of a large scale, and it is difficult to be mounted on an actual apparatus under the present conditions.

The present invention has been achieved in view of these problems in the conventional arts, and aims at providing an objective lens for use in an optical pickup device and the optical pickup device, wherein the optical pickup device is capable of high-density recording and reproducing of information on an optical disc with a light flux with a short wavelength and the objective lens exhibits excellent temperature characteristics, high light utilization efficiency, and sufficiently secured back focus despite an objective lens made of plastics.

Solution to Problem

Item 1 describes an objective lens for use in an optical pickup device comprising a light source emitting a light flux with a wavelength of 450 nm or lower, and a light-converging optical system including an objective lens for converging the light flux emitted by the light source onto an information recording surface of an optical information recording medium, the optical pickup device being capable of recording and/or reproducing information when the light converging optical system converges the light flux from the light source onto the information recording surface of the optical information recording medium, the objective lens comprising:

a single lens body made with a plastic, and a ring-shaped structure arranged on at least one optical surface of the objective lens and including ring-shaped zones which are three or more and thirty or less in number and are formed such that adjoining ring-shaped zones cause a predetermined optical path difference for an incident light flux, wherein the ring-shaped structure is formed as a turning structure comprising steps whose directions change at least once within an effective aperture, and the objective lens satisfies the following expressions.

$$NA \geq 0.8 \tag{1}$$

$$2.2 \geq f(\text{mm}) \geq 0.9 \tag{2}$$

$$0 \leq \delta SAT/f\,(\lambda\text{rms}/°\text{C.}\cdot\text{mm}) \leq 0.0015 \tag{3}$$

$$-0.015 \leq \delta SA\lambda/f\,(\lambda\text{rms/nm}\cdot\text{mm}) \leq -0.003 \tag{4}$$

In these expressions, NA is an image side numerical aperture of the objective lens required for recording and/or reproducing information for the optical information recording medium, f (mm) is a focal length of the objective lens, δSAT (λrms/° C.) is a change rate of a third order spherical aberration of the objective lens caused by a temperature change (δSA3/δT), and δSAλ (λrms/nm) is a change rate of a third order spherical aberration of the objective lens caused by a wavelength change (δSA3/δλ).

Further, in these expressions, δSAT is measured or calculated under a condition that a change rate of a wavelength of an incident light flux entering the objective lens caused by a temperature change is +0.05 nm/° C., and a sign of the third spherical aberration in δSAT and δSAλ is defined as "positive" for a change in an over-corrected direction and as "negative" for a change in an under-corrected direction.

Taking into consideration that an optical pickup device is used under various environments, it can be said that it is difficult to maintain the ambient temperature constantly. Therefore, when a lens with bad temperature characteristics is used, it requires control of a spherical aberration caused by an environmental temperature change like the active correcting mechanism mentioned above. There is a possibility of the construction of an optical pickup device being complicated and causing a high cost. On the other hand, a major cause of a deviation of the wavelength of the light flux emitted from the light source compared with the reference wavelength is from an individual difference of a device used as a light source, such as a semiconductor laser. Therefore, the correction amount of the spherical aberration is decided in advance corresponding to the deviation of the light source to be mounted on the same optical pickup device compared with the reference wavelength, when using an objective lens with bad wavelength characteristics in an optical pickup device. Thereby, a spherical aberration can be corrected by a mechanism which corrects the spherical aberration based on the decided correction amount, at the time of the assembly of the optical pickup device and at the early stage of operation of the optical pickup device. This correction will be maintained through the operation of the optical pickup device.

The inventor noticed requirements peculiar to such an optical pickup device, and developed a new objective lens suitable for it. More concretely, the inventor created an objective lens to suppress generation of a spherical aberration even if a temperature change arises, by sacrificing the wavelength characteristics so as to satisfy the expression (4) and by enhancing the temperature characteristics so as to satisfy the expression (3). Such good temperature characteristics can be acquired by providing the ring-shaped structure on an optical surface of an objective lens, in which the ring-shaped structure comprises ring-shaped zones whose number is 3 or more and 30 or less and the ring-shaped structure is formed such that the adjoining ring-shaped zones cause a predetermined optical path difference for an incident light flux.

Figure 1A:
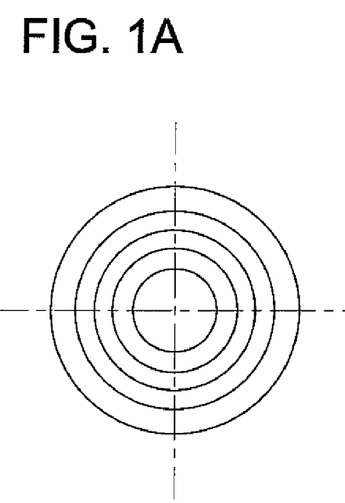
Figure 1B:
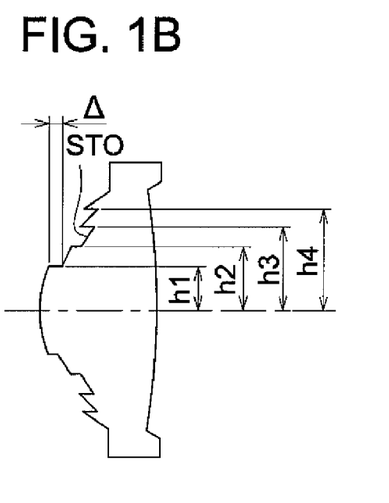

In particular, a plastic objective lens with high NA and relatively long focal length f as shown by the expression (2) in order to sufficiently secure a back focus, has a tendency to remarkably deteriorate the spherical aberration caused by a temperature change. Thus, when trying to enhance the bad temperature characteristics by a blaze-type diffractive structure, it increases the number of ring-shaped zones and reduces the width of the ring-shaped zones. It causes a possibility that the light utilization efficiency of the objective lens may fall because of a shape error caused when processing a mold or a defective transfer caused when the lens is molded. On the other hand, by employing a ring-shaped structure having a turning structure in which directions of steps change at least once in the effective aperture as described in the present invention, the number of ring-shaped zones can be reduced comparing with a diffractive structure of a blaze structure, when correcting the same amount of the temperature characteristics. Thereby, it enables to enhance the light utilization efficiency of the objective lens. The turning structure in this specification is a structure as shown, for example, in FIGS. 1A and 1B. In this example, directions of the steps differ between an area close to the optical axis and an area being away from the optical axis, which are arranged at both sides of ring-shaped zone STO. In the other words, it can be say that steps are provided in an area up to the predetermined height along the perpendicular direction of the optical axis so that the depths may become deep, and steps are provided in an area being away from the predetermined height so that the depths may become shallow. In FIG. 1B, step Δ is defined as "positive" when adjoining ring-shaped zones are provided such that the ring-shaped zone arranged being away from the optical axis is displaced to be close to the optical information recording medium compared with the ring-shaped zone arranged being close to the optical axis, and is defined as "negative" when adjoining ring-shaped zones are provided such that the ring-shaped zone arranged being away from the optical axis is displaced to be away from the optical information recording medium compared with the ring-shaped zone arranged being close to the optical axis. Concretely, the steps h1 and h2 are positive and the steps h3 and h4 are negative.

The inventor of the present invention found that the necessary requirements for recording and/or reproducing information excellently are different between the case where the focal length is short and the case where the focal length is long. That is, the inventor found that an excellent recording and/or reproducing of information could be performed when the focal length is lengthened, by thinking temperature characteristics as important at the sacrifice of a wavefront aberration.

Figure 2A:
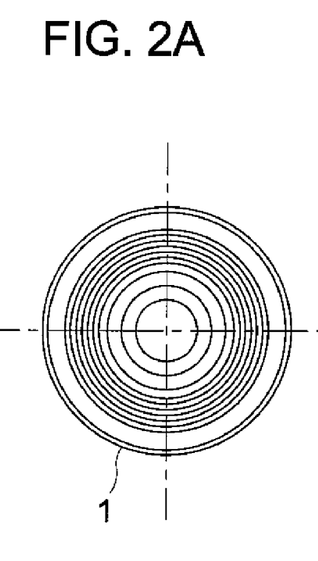
Figures 2B, 2C:
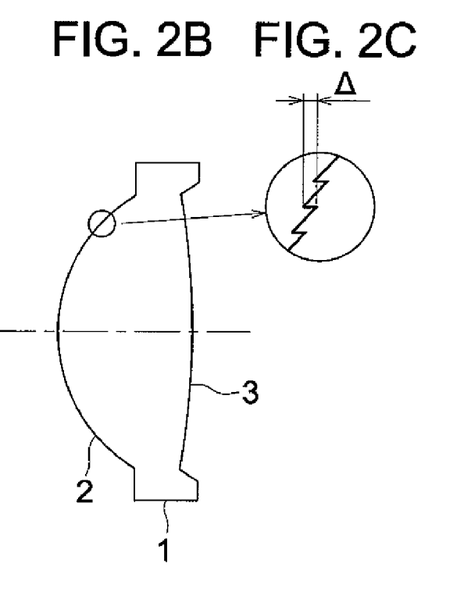

The blaze type diffractive structure in this specification is a structure shown in FIGS. 2A, 2B and 2C. In FIGS. 2A, 2B and 2C, objective lens 1 is a single biconvex lens made with a plastic which includes two optical surfaces 2 and 3 being aspheric surfaces. On optical surface 2, as shown in FIG. 2A, there is formed a ring-shaped structure as a diffractive structure in a concentric circular shape whose center is on the optical axis. As shown in FIG. 2C, this ring-shaped structure has steps Δ extending in an optical axis direction and positioned at the boundaries of ring-shaped zones like a Fresnel lens, and does not have the turning structure. The laser beam which enters an arbitral ring-shaped zone of this ring-shaped structure is diffracted in a direction determined with the width in the direction perpendicular to the optical axis of the ring-shaped zone.

Figure 3:
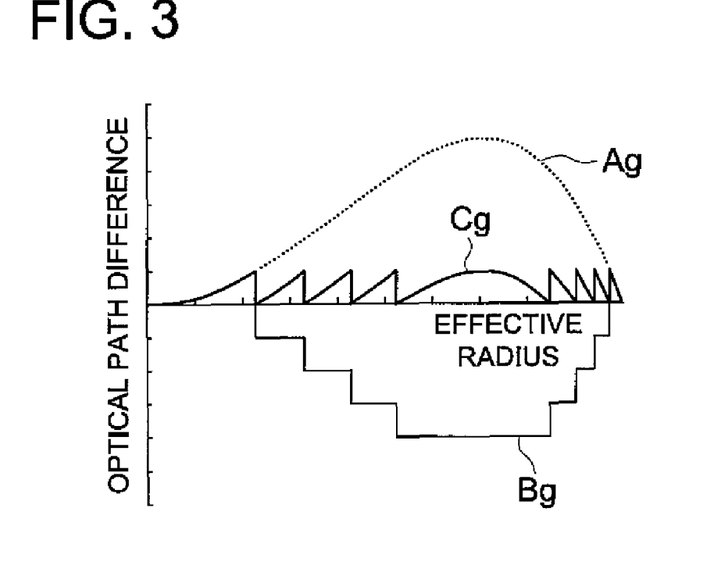
FIG. 3 is a diagram showing a state of a wavefront of a plastic single biconvex lens with two optical surfaces each being an aspheric surface, when a temperature rises by 30° C. from a design reference temperature.

The principle of correction of the temperature characteristics by the turning structure is shown in FIG. 3. FIG. 3 is a diagram showing a condition of a wavefront of a plastic single lens with two aspheric optical surfaces when the temperature rises by 30° C. from the design reference temperature. The horizontal axis of FIG. 3 represents the effective radius of the optical surface, and the vertical axis represents an optical path difference. In the plastic single lens, a spherical aberration occurs under the influence of the refractive index change according to a temperature rise, and a wavefront changes as shown in line Ag of FIG. 3. Line Bg in FIG. 3 shows an optical path difference added to a transmitted wavefront by the ring-shaped structure having the turning structure. Lines Cg in FIG. 3 represents a condition of a wavefront which passing this ring-shaped structure and the plastic single lens when the temperature rises by 30° C. from the design reference temperature. As can be seen from lines Bg and Cg, the wavefront which passes this ring-shaped structure, and the wavefront of the plastic single lens when the temperature rises by 30° C. from the design reference temperature cancel out each other. Thereby, the wavefront of the laser light flux converged on the information recording surface of an optical information recording medium will turn into a good wavefront without an optical path difference when if it is viewed macroscopically, thus the temperature characteristics of the plastic single lens are corrected by this ring-shaped structure.

Figure 4:
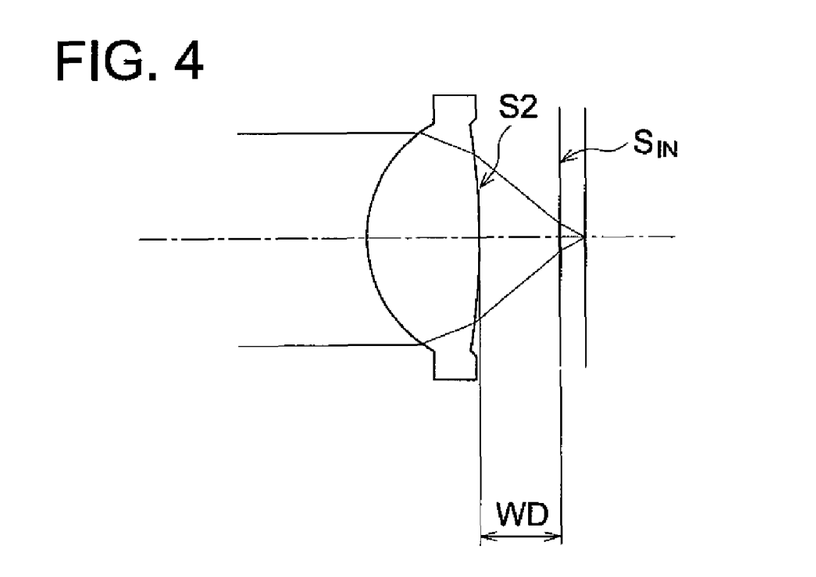
FIG. 4 is a diagram for illustrating working distance WD.

In this specification, a working distance refers to interval WD on the optical axis between the surface peak point of optical surface S2 of an objective lens facing an optical information recording medium and light-incident surface $S_{IN}$ of an optical information recording medium, as shown in FIG. 4, under the condition that the objective lens is adjusted to be focused on the information recording surface of the optical information recording medium.

The following expressions (3)' and (4)' may be satisfied.

$$0 < \delta SAT/f (\lambda rms/°C \cdot mm) \leq 0.0012 \quad (3)'$$

$$-0.012 \leq \delta SA\lambda/f (\lambda rms/nm \cdot mm) \leq -0.006 \quad (4)'$$

Item 2 describes the objective lens for the optical pickup device wherein, in the invention described in Item 1, the directions of the steps change at any one of the ring-shaped zones (for example, ST0 in FIG. 1B formed within an area which covers 60% to 80% of height of the effective aperture, on the optical surface including the ring-shaped structure. In this specification, unless it is clearly indicated, "height" means a length along a direction perpendicular to the optical axis of an objective lens, and "depth" means a length along a direction of the optical axis.

Thus, it is possible to effectively reduce generation of a spherical aberration according to a temperature change by properly deciding the position of the ring-shaped zone where the step direction switches. When the position of the above-mentioned ring-shaped zone is formed in a position being closer to the optical axis than 60% of the height of the effective aperture or the position being farther from the optical axis than 80% of the height of the effective aperture, a spherical aberration of higher order, which is fifth or more order, easily causes according to a temperature change. It deteriorates the property of the optical pickup device at the time of ambient temperature change.

Item 3 describes the objective lens for the optical pickup device wherein, in the invention of Item 1 or 2, when a light flux with a wavelength which is a design reference wavelength $\lambda_0$ (nm) of the objective lens enters the objective lens, each step causes the optical path difference represented by the following expression and an absolute value of m is a natural number being two or more at a step formed at a position being away toward an outside along a perpendicular direction to an optical axis from a ring-shaped zone where the directions of the steps change.

$$m = INT(X)$$

In the expression, X satisfies $X = \Delta \cdot (N_0 - 1)/(\lambda_0 \cdot 10^{-3})$, INT(X) represents an integer obtained by rounding X, $\Delta(\mu m)$ is a depth of the step and is defined as "positive" when one of the adjoining ring-shaped zones on a side being away from the optical axis displaces toward the optical information recording medium compared with the other of the adjoining ring-shaped zones on a side being closer to the optical axis, and is defined as "negative" when one of the adjoining ring-shaped zones on the side being away from the optical axis displaces away from the optical information recording medium compared with the other of the adjoining ring-shaped zones on the side being closer to the optical axis, and $N_0$ is a refractive index of the objective lens at the design reference wavelength $\lambda_0$ (nm).

When the third spherical aberration is expressed by an optical path difference, it has an inflection point at about 70% of height of the effective aperture. A ring-shaped zone corresponding to the position of the inflection point, is the above-described ring-shaped zone (ST0 in FIG. 1B) where the directions of steps change. Since the third spherical aberration changes against the height from the optical axis so as to represent a quartic function, it has the tendency for the change amount to become large in the outside of the inflection point. Therefore, if the value of m is set to two or more in the steps formed in the area at the outside of the inflection point, namely, at the outside of the ring-shaped zone where directions of steps change, widths of the ring-shaped zones in this area can be secured to be large. It enables to reduce decline in the light utilization efficiency by the shape error caused when a mold is processed and the defective transfer when the lens is molded. In this case, one lens may have plural values of m.

In order to demonstrate this operation effect much more effectively, it is preferable to make the value of m into three or more, and is more preferable to make the value of m into four or more, in the steps formed in the area at the outside of the inflection point.

Further, it is preferable that the absolute value of n in the following conditional expressions is equal to at least one absolute value of m, or smaller than the absolute value of m, in the steps formed in an area which is inner side along the direction perpendicular to the optical axis than the ring-shaped zone where the directions of steps change (ST0 in FIG. 1B).

$$n = INT(Y)$$

In the expression, Y satisfies $Y = \Delta \cdot (N_0 - 1)/(\lambda_0 \cdot 10^{-3})$, INT(Y) represents an integer obtained by rounding the value of Y, and definitions of the others are same as those of the expressions described above.

Item 4 describes the objective lens for the optical pickup device wherein, in the invention described in any one of Items 1 to 3, each of the ring-shaped zones has an aspheric shape represented by a function in a same style in the ring-shaped structure, and at least two of the ring-shaped zones have different aspheric surface coefficients from each other.

When the ring-shaped zone structure is formed on the objective lens with NA of 0.8 or more as the objective lens of the present invention, a large amount of the spherical aberration may remain to cause a deteriorate effect in information recording/reproducing characteristics for an optical information recording medium, only by displacing ring-shaped zones expressed by the same aspherical coefficient in parallel with the optical axis direction. Therefore, in order to make the remain of the spherical aberration small, it is preferable that at least two ring-shaped zones have different aspherical coefficients from each other. In order to make the remain of a spherical aberration further smaller, it is preferable that ring-shaped zones formed in an outer area than the ring-shaped zone where the directions of steps change, have different aspherical coefficients from the others. It is more preferable that all the ring-shaped zones have different aspherical coefficients from the others. Thus, it enables to provide an objective lens which is excellent in information recording/reproducing characteristics by optimizing aspherical coefficients for every ring-shaped zone and correcting the spherical aberration caused in each ring-shaped zone.

Item 5 describes the objective lens for the optical pickup device wherein, in the invention descried in any one of Items 1 to 4, the objective lens satisfies the following expression.

$$40 \leq (m \cdot M)/(f \cdot NA^4) \leq 80$$

In the expression, m is a mean of absolute values of diffraction orders of diffracted light fluxes generated by the ring-shaped structure within the effective aperture of the objective lens, and M is a total number of the ring-shape zones of the ring-shaped structure formed within the effective aperture of the objective lens.

The mean of absolute values of the diffraction orders of diffracted light fluxes which are generated by the ring-shaped structure in the effective aperture, can be calculated by dividing the sum total of the absolute values of the diffraction orders of the diffracted light fluxes each generated with the maximum amount at each step positioned between the ring-shaped zones by the number of the steps. More specifically, mean $m_{ave}$ of the absolute values of the diffraction orders of the diffracted light fluxes generated by the ring-shaped structure within the effective aperture can be calculated as follows.

When step amounts (μm) of the steps formed within the effective aperture are defined as $\Delta_1, \Delta_2, \ldots$, and $\Delta_{i-1}, \Delta_i$, in this order from the one closest to the optical axis, it shall be calculated as follows:

$$m_{ave} = \Sigma |m_i|/i,$$

where $m_i = INT(X_i)$, and $$X_i = \Delta_i \cdot (N_0 - 1)/(\lambda_0 \cdot 10^{-3}).$$

In the expressions, INT(X) represents an integer obtained by rounding the value of X, $\Delta_i$ (μm) is a depth of the step along the optical axis, and $N_0$ is a refractive index of the objective lens at the design reference wavelength $\lambda_0$ (nm). When the step is arranged to face the opposite direction to the optical axis (for example, steps h1 and h2 shown in FIG. 1B), the value of m becomes negative, and when the step is arranged to face the optical axis (for example, steps h3 and h4 shown in FIG. 1B), the value of m becomes positive.

When there are a smaller numbers of ring-shaped zones, it is preferred to enlarge the diffraction order. When there are a larger number of ring-shaped zones, it is preferred to lessen the diffraction order. When the focal length is long or when the numerical aperture is large, it is preferred to increase the diffraction order and/or the number of ring-shaped zones. That is, the objective lens which satisfies the expressions (1), (2), (3), and (4) can be obtained by satisfying the above-mentioned conditional expressions. It can be said that the above-mentioned conditional expressions express the present invention as the structure of an objective lens.

It is preferable that the following expression is satisfied.

$$45 \leq (m \cdot M)/(f \cdot NA^4) \leq 75$$

It is further more preferable that the following expression is satisfied.

$$50 \leq (m \cdot M)/(f \cdot NA^4) \leq 70$$

Item 6 describes the objective lens for the optical pickup device wherein, in the invention described in any one of Items 1 to 5, a total number of the ring-shape zones is 5 or more, and 20 or less. It makes a processing of a mold easy. It is further more preferable that the total number of the above-mentioned ring-shaped zones is 7 or more and 12 or less, because it can reduce the influence of the objective lens on the light utilization efficiency caused by a shape error when a mold is processed or a defective transfer when the lens is molded.

Item 7 describes the objective lens for the optical pickup device wherein, in the invention described in any one of Items 1 to 6, the objective lens satisfies the following expression.

$$1.0 \leq d/f \leq 1.7$$

In the expression, d (mm) is a thickness of the objective lens along an optical axis.

It is preferable that the following expression is satisfied.

$$1.2 \leq d/f \leq 1.5$$

Item 8 describes the objective lens for the optical pickup device wherein, in the invention described in any one of Items 1 to 7, a working distance when information is recorded and/or reproduced for the optical information recording medium, is 0.25 mm or more. It is further more preferable that the following expression (4)" is satisfied, in order to satisfy the requirement about the working distance.

$$-0.015 \leq \delta SA\lambda/f (\lambda \text{rms/nm·mm}) \leq -0.009 \qquad (4)''$$

It enables to sufficiently secure the working distance at the time of performing recording/reproduction of information on an optical information recording medium, and to improve the operational reliability of the optical pickup device.

Item 9 describes an optical pickup device on which the objective lens of any one of Items 1 to 8 is mounted.

Item 10 describes the optical pickup device of Item 9, further comprising: a mechanism which corrects a spherical aberration caused on the objective lens, the spherical aberration being caused by a change of the wavelength of the light flux emitted from the light source.

It enables the optical pickup device to employ the objective lens of the present invention in which the wavelength characteristics satisfies the expression (4). As for the correcting mechanism of the spherical aberration, various construction can be considered. For example, it may adjust a position in the optical axis direction of a coupling lens (it includes a collimating lens for converting light into a parallel light flux) which changes an angle of a divergent light flux emitted from a light source to guide the light to the objective lens, and may adjust a position in the optical axis direction of a lens constituting a beam expander which changes a diameter of a light flux. An aberration correction element using liquid crystal may be employed other than the ways to adjust a lens in the optical axis direction as described above, and a position of a light source in the optical axis direction may be adjusted, too. As the correcting mechanism of the spherical aberration, it is not limited only to the examples mentioned above.

In this specification, an objective lens is defined to refer an objective lens which has a light-converging function and is arranged at the closest position to an optical information recording medium to face the optical information recording medium under the situation that the optical information recording medium is mounted on the optical pickup device. Therefore, in this specification, the numerical aperture of the objective lens at the side of the optical information recording medium (image side numerical aperture) means the numerical aperture of the lens surface located closest to the optical information recording medium in the objective lens. In this specification, a required (predetermined) numerical aperture means a numerical aperture which is specified by the standard of optical information recording media or a numerical aperture of an objective lens having a property of diffraction limit for an information recording medium so as to obtain a spot diameter required to recording and/or reproducing information accompanied with a wavelength of a light source to be used.

EFFECTS OF THE INVENTION

The present invention can provide an objective lens for an optical pickup device and the optical pickup device, and the optical pickup device is capable of high-density recording and/or reproducing of information on an optical disc by using a light flux with a short wavelength, while maintaining temperature characteristics good in spite of employing a plastic objective lens.

BRIEF DESCRIPTION OF DRAWINGS

Each of FIGS. 1A and 1B is a schematic diagram showing an objective lens including a ring-shaped structure.

Each of FIGS. 2A, 2B and 2C is a schematic diagram showing an objective lens including a ring-shaped structure.

REFERENCE SIGNS LIST

AC Actuator
BB Bobbin
COL Collimating lens
DBS1 First dichroic prism
DBS2 Second dichroic prism
HLD Hologram laser unit
LD1 First semiconductor laser
LD2 Second semiconductor laser
M1 First reflecting surface
M2 Second reflecting surface
OBJ1 First objective lens
OBJ2 Second objective lens
PBS Polarized light beam splitter
PD1 Photodetector
PS Prism
PU1 Optical pickup device
QWP $\lambda/4$ wavelength plate

BEST MODE FOR CARRYING OUT THE INVENTION

Figure 5:
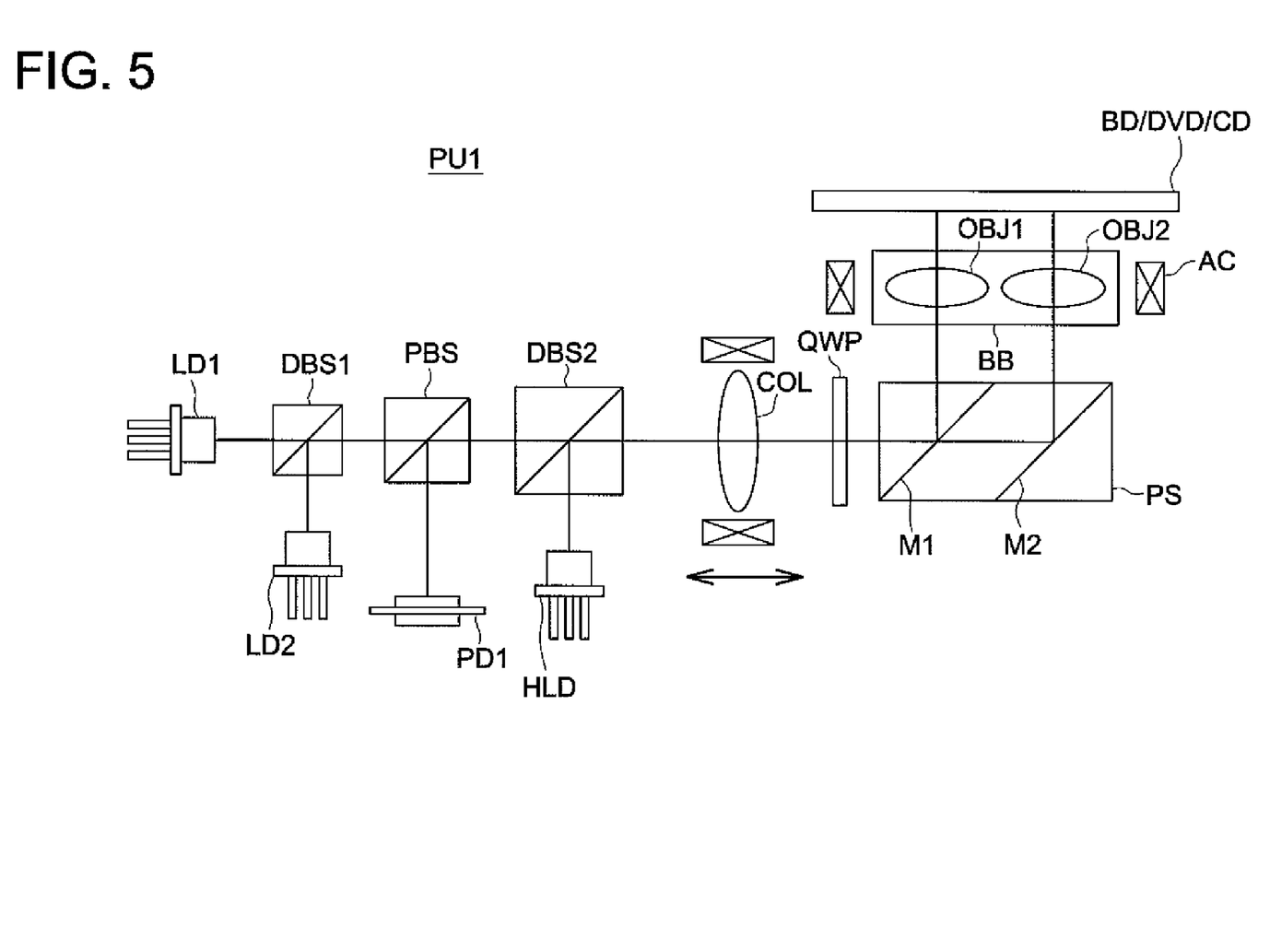
FIG. 5 is a diagram schematically showing the structure of optical pickup device PU1 in the first embodiment.

An embodiment of the invention will be explained in detail as follows, referring to the drawings. FIG. 5 is a diagram schematically showing the structure of optical pickup device PU1 in the present embodiment that is capable of recording and reproducing information properly for BD, DVD and CD representing optical information recording media (which are called also optical discs). This optical pickup device PU1 can be mounted on an optical information recording and reproducing apparatus.

The optical pickup device PU1 includes therein first semiconductor laser LD1 that emits a laser light flux (light flux) with wavelength of 405 nm radiated in the case of recording and reproducing information for BD, second semiconductor laser LD2 that emits a laser light flux (light flux) with wavelength of 655 nm radiated in the case of recording and reproducing information for DVD, photodetector PD1 that receives reflected light that comes from BD or DVD, hologram laser unit HLD that is equipped with third semiconductor laser that emits a laser light flux (light flux) with wavelength of 785 nm radiated in the case of recording and reproducing information for CD and with a photodetector that receives reflected light that comes from CD, first dichroic prism DBS1, polarized beam splitter PBS, second dichroic prism DBS2, collimating lens COL, $\lambda/4$ wavelength plate QWP, bend-up prism PS including first reflection surface M1 and second reflection surface M2 both reflecting light fluxes having different and prescribed wavelengths and transmitting others, first objective lens OBJ1 used for BD exclusively, and second objective lens OBJ2 used for DVD and CD commonly. Single and plastic first objective lens OBJ1 includes, on its optical surface facing the light source, a ring-shaped structure shown in FIGS. 1A and 1B including a turning structure composed of ring-shaped zones which are 3 or more and 30 or less in number. The first objective lens OBJ1 and the second objective lens OBJ2 are arranged to be supported and driven by bobbin BB as one body.

In the present embodiment, collimating lens COL can be adjusted in terms of its position along the optical axis by an unillustrated aberration correcting mechanism. Namely, it can be adjusted so that a spherical aberration may be kept in a tolerable range for an actual light flux when assembling optical pickup device PU1, by measuring a wavelength of a light flux emitted actually from the first semiconductor laser LD1, then, displacing collimating lens COL in the optical axis direction in accordance with shifting from the reference wavelength.

Further, when recording and/or reproducing information for two-layer BD or for two-layer DVD, it is preferable to correct a spherical aberration caused by a focus jump between layers, by using this aberration correcting mechanism.

When recording and/or reproducing information for BD, first semiconductor laser LD1 is caused to emit a light flux having a wavelength of $\lambda1$. This light flux passes through first dichroic prism DBS1, polarized beam splitter PBS and second dichroic prism DBS2, and is converted into a light flux that is almost parallel by collimating lens COL. Then, it passes through $\lambda/4$ wavelength plate QWP, and is reflected on first reflection surface M1 of bend-up prism PS to be converged by first objective lens OBJ1 on an information recording surface through a protective layer of BD (thickness t1; 0.03 mm$\leq$t1$\leq$0.13 mm), thus, a converged spot is formed on the information recording surface.

The light flux modulated and reflected on the information recording surface by information pits passes through the first objective lens OBJ1 again, and is reflected on first reflection surface M1 of the bend-up prism PS to pass through the $\lambda/4$ wavelength plate QWP, collimating lens COL and the second dichroic prism DBS2. Then, it is reflected by polarized beam splitter PBS to enter a light receiving surface of photodetector PD1. Therefore, it is capable of recording and/or reproducing information for BD by using its output signal.

Further, changes in a light amount caused by changes in form and position of a spot on the photodetector PD1 are detected to conduct focusing detection and track detection. Based on this detection, actuator AC is driven to move the first objective lens OBJ1 together with bobbin BB so that a light flux emitted by the first semiconductor laser LD1 may form an image on an information recording surface of BD.

When recording and/or reproducing information for DVD, second semiconductor laser LD2 is caused to emit a light flux having a wavelength of $\lambda2$. This light flux is reflected by first dichroic prism DBS1, and passes through polarized beam splitter PBS and second dichroic prism DBS2. Then, it is converted into a light flux that is almost parallel by collimating lens COL, passes through $\lambda/4$ wavelength plate QWP and first reflection surface M1 of bend-up prism PS, is reflected on second reflection surface M2 to be converged by second objective lens OBJ2 on an information recording surface through a protective layer of DVD (thickness t2; 0.5 mm≦t2≦0.7 mm), thus, a converged spot is formed on the information recording surface.

Then, the light flux modulated and reflected on the information recording surface by information pits passes through the second objective lens OBJ2 again, and is reflected on second reflection surface M2 of the bend-up prism PS to pass through the first reflection surface M1, the λ/4 wavelength plate QWP, collimating lens COL and the second dichroic prism DBS2. Then, it is reflected by polarized beam splitter PBS to enter a light receiving surface of photodetector PD1. Therefore, it is capable of recording and/or reproducing information for DVD by using its output signal.

Further, changes in the light amount caused by changes in form and position of a spot on the photodetector PD1 are detected to conduct focusing detection and track detection. Based on this detection, actuator AC is driven to move the second objective lens OBJ2 together with bobbin BB so that a light flux emitted by the second semiconductor laser LD2 may form an image on an information recording surface of DVD.

When recording and/or reproducing information for CD, third semiconductor laser of hologram laser unit HLD is caused to emit a light flux having a wavelength of λ3. This light flux is reflected by second dichroic prism DBS2, and is converted by collimating lens COL into a light flux that is almost parallel. Then, it passes through λ/4 wavelength plate QWP and first reflection surface M1 of bend-up prism PS, and is reflected on second reflection surface M2 to be converged by second objective lens OBJ2 on an information recording surface through a protective layer of CD (thickness t3; 1.1 mm≦t3≦1.3 mm), thus, a converged spot is formed on the information recording surface.

The light flux modulated and reflected on the information recording surface by information pits passes through the second objective lens OBJ2 again, and is reflected on second reflection surface M2 of the bend-up prism PS. Then, it passes through first reflection surface M1, the λ/4 wavelength plate QWP and collimating lens COL and is reflected on the second dichroic prism DBS2, to enter a light receiving surface of a photodetector of hologram laser unit HLD. Therefore, it is capable of recording and/or reproducing information for CD by using its output signal.

Further, changes in light amount caused by changes in form and position of a spot on a photodetector of hologram laser unit HLD are detected to conduct focusing detection and track detection. Based on this detection, actuator AC is driven to move the second objective lens OBJ2 together with bobbin BB so that a light flux emitted by the third semiconductor laser may form an image on an information recording surface of CD.

In the optical pickup device shown in FIG. 5, a spherical aberration that is caused on the objective lens by wavelength changes of a light flux emitted from the light source, is corrected by moving collimating lens COL in the optical axis direction (direction of arrow shown in FIG. 5).

EXAMPLES

Numerical examples which are appropriate for the aforesaid embodiment will be explained as follows. Hereinafter (including lens data in Tables), a number represented by a power of ten (for example, $2.5 \times 10^{-3}$) is represented by using E (for example, 2.5E−3).

Hereinafter (including lens data in Tables), R represents a paraxial curvature radius, D represents a distance along the optical axis and N represents a refractive index at wavelength λ. Table 1 further collectively shows refractive indexes in the reference state and refractive indexes under the state where a temperature and a wavelength are changed from those in the reference state, which were used for calculations of objective lenses in Examples 1 to 5.

TABLE 1

| Example | | 1 | 2 | 3 | 4 | 5 |
|---|---|---|---|---|---|---|
| Reference state | Wavelength [nm] | 407.5 | 405 | 405 | 405 | 405 |
| | Temperature [° C.] | 35 | 35 | 35 | 35 | 25 |
| | Lens refractive index | 1.55883 | 1.55923 | 1.55923 | 1.55923 | 1.56013 |
| Temperature characteristic | Wavelength [nm] | 409 | 406.5 | 406.5 | 406.5 | 406.5 |
| | Temperature [° C.] | 65 | 65 | 65 | 65 | 55 |
| | Lens refractive index | 1.55589 | 1.55629 | 1.55629 | 1.55629 | 1.55719 |
| Wavelength characteristic | Wavelength [nm] | 412.5 | 410.0 | 410.0 | 410.0 | 410.0 |
| | Temperature [° C.] | 35 | 35 | 35 | 35 | 25 |
| | Lens refractive index | 1.55804 | 1.55843 | 1.55843 | 1.55843 | 1.55933 |

Optical surfaces of optical systems relating to Examples 1 to 5 are prescribed by a numerical expression in which coefficients shown in Tables are substituted respectively in Expression (5).

$$z = (y^2/r)/[1 + \sqrt{\{1 - (\kappa + 1)(y/r)^2\}}] + A_0 + A_4 y^4 + A_6 y^6 + A_8 y^8 + \quad (5)$$
$$A_{10} y^{10} + A_{12} y^{12} + A_{14} y^{14} + A_{16} y^{16} + A_{18} y^{18} + A_{20} y^{20}$$

In the aforesaid expression, z represents an aspheric surface shape (a distance in the direction along the optical axis from a plane that is tangential to the aspheric surface at the vertex), y represents a distance from the optical axis, r represents a curvature radius, K represents a conic constant and $A_0$, $A_4$, $A_6$, $A_8$, $A_{10}$, $A_{12}$, $A_{14}$, $A_{16}$, $A_{18}$ an $A_{20}$ represent aspheric surface coefficients.

Namely, optical surfaces of optical systems relating to Examples 1 to 5 are formed in aspheric surfaces which are axial symmetry around the optical axis, and they include ring-shaped structures each of which is divided by a starting height and an ending height in Tables.

Example 1

Table 2 shows data of Example 1 for an objective lens which is suitable for the optical pickup device relating to the present embodiment.

TABLE 2

| Paraxial data | | | | |
|---|---|---|---|---|
| Surface $N_o$ | r(mm) | d(mm) | $N_0$ | Remarks |
| 0 | ∞ | | | Object point |
| 1 | See below | 1.44000 | 1.55883 | Objective lens |
| 2 | See below | 0.20255 | | |
| 3 | ∞ | 0.08750 | 1.61849 | Protective layer |
| 4 | ∞ | | | |

Ring-shaped zone pattern, curvature radius and aspheric surface coefficient

First surface

| *1 | 1 | 2 | 3 | 4 | 5 | 6 | 7 |
|---|---|---|---|---|---|---|---|
| *2 | 0.000 | 0.306 | 0.425 | 0.544 | 0.760 | 0.800 | 0.840 |
| *3 | 0.306 | 0.425 | 0.544 | 0.760 | 0.800 | 0.840 | 0.880 |
| *4 | — | 4 | 4 | 4 | −4 | −4 | −4 |
| r | 0.693820 | 0.692992 | 0.691765 | 0.688947 | 0.693411 | 0.693664 | 0.693809 |
| κ | −4.690065E−01 | −4.639617E−01 | −4.656045E−01 | −4.732155E−01 | −4.627171E−01 | −4.642693E−01 | −4.650417E−01 |
| A0 | 0.000000E+00 | 2.923168E−03 | 5.825000E−03 | 8.557872E−03 | 6.968330E−03 | 3.725686E−03 | −2.449999E−04 |
| A4 | 2.913920E−02 | 2.913920E−02 | 2.913920E−02 | 2.373257E−02 | 2.913903E−02 | 2.913622E−02 | 2.913915E−02 |
| A6 | −1.613850E−01 | −1.613850E−01 | −1.613850E−01 | −1.499846E−01 | −1.613853E−01 | −1.613855E−01 | −1.613851E−01 |
| A8 | 8.260800E−01 | 8.260800E−01 | 8.260800E−01 | 8.260800E−01 | 8.260795E−01 | 8.260797E−01 | 8.260800E−01 |
| A10 | −2.280400E+00 | −2.280400E+00 | −2.280400E+00 | −2.280400E+00 | −2.280400E+00 | −2.280750E+00 | −2.280400E+00 |
| A12 | 1.732930E+00 | 1.732930E+00 | 1.732930E+00 | 1.732930E+00 | 1.732930E+00 | 1.732930E+00 | 1.732930E+00 |
| A14 | 7.302860E+00 | 7.302860E+00 | 7.302860E+00 | 7.302860E+00 | 7.302860E+00 | 7.302860E+00 | 7.302860E+00 |
| A16 | −2.308110E+01 | −2.308110E+01 | −2.308110E+01 | −2.308110E+01 | −2.308110E+01 | −2.308110E+01 | −2.308110E+01 |
| A18 | 2.692430E+01 | 2.692430E+01 | 2.692430E+01 | 2.692430E+01 | 2.692430E+01 | 2.692430E+01 | 2.692430E+01 |
| A20 | −1.211240E+01 | −1.211240E+01 | −1.211240E+01 | −1.211240E+01 | −1.211240E+01 | −1.211240E+01 | −1.211240E401 |

Ring-shaped zone pattern, curvature radius and aspheric surface coefficient

Second surface

| | |
|---|---|
| Ring-shaped zone No. i | — |
| Starting height hs | |
| Ending height he | |
| Optical path difference m | |
| r | −0.750490 |
| κ | −3.954895E+01 |
| A0 | 0.000000E+00 |
| A4 | 1.628640E+00 |
| A6 | −9.247310E+00 |
| A8 | 2.520710E+01 |
| A10 | −4.095560E+01 |
| A12 | 5.676910E+01 |
| A14 | −6.291400E+01 |
| A16 | 9.409310E−07 |
| A18 | 0.000000E+00 |
| A20 | 0.000000E+00 |

*1: Ring-shaped zone No. i,
*2: Starting height hs,
*3: Ending height he
*4: Optical path difference m

Example 2

Table 3 shows data of Example 2 for a objective lens which is suitable for the optical pickup device relating to the present embodiment.

TABLE 3

Paraxial data

| Surface No. | r(mm) | d(mm) | $N_0$ | Remarks |
|---|---|---|---|---|
| 0 | | ∞ | | Object point |
| 1 | See below | 1.57000 | 1.55923 | Objective lens |
| 2 | See below | 0.29454 | | |
| 3 | ∞ | 0.08750 | 1.61958 | Protective layer |
| 4 | ∞ | | | |

Ring-shaped zone pattern, curvature radius and aspheric surface coefficient

First surface

| *1 | 1 | 2 | 3 | 4 | 5 | 6 | 7 |
|---|---|---|---|---|---|---|---|
| *2 | 0.000 | 0.290 | 0.430 | 0.572 | 0.890 | 0.940 | 0.966 |
| *3 | 0.290 | 0.430 | 0.572 | 0.890 | 0.940 | 0.966 | 1.050 |
| *4 | — | 5 | 5 | 5 | −6 | −4 | −5 |
| r | 0.800501 | 0.799795 | 0.798445 | 0.797906 | 0.799542 | 0.801811 | 0.800500 |
| κ | −3.817386E−01 | −4.654568E−01 | −4.713136E−01 | −4.756380E−01 | −4.720375E−01 | −4.714471E−01 | −4.696004E−01 |
| A0 | 0.000000E+00 | 3.633732E−03 | 7.246307E−03 | 1.093485E−02 | 6.517879E−03 | 5.140940E−03 | −4.174872E−03 |
| A4 | −9.047210E−03 | 1.706049E−02 | 1.879958E−02 | 2.229793E−02 | 2.096433E−02 | 1.489731E−02 | 3.540244E−02 |
| A6 | −7.657094E−02 | −7.657094E−02 | −7.657094E−02 | −7.902060E−02 | −7.657094E−02 | −6.908422E−02 | −9.194785E−02 |
| A8 | 2.710619E−01 | 2.710619E−01 | 2.710619E−01 | −2.751496E−01 | 2.710619E−01 | 2.710619E−01 | 2.710619E−01 |
| A10 | −5.287776E−01 | −5.287776E−01 | −5.287776E−01 | −5.287776E−01 | −5.287776E−01 | −5.287776E−01 | −5.287776E−01 |
| A12 | 2.815598E−01 | 2.815598E−01 | 2.815598E−01 | 2.815598E−01 | 2.815598E−01 | 2.815598E−01 | 2.815598E−01 |
| A14 | 8.875142E−01 | 8.875142E−01 | 8.875142E−01 | 8.875142E−01 | 8.875142E−01 | 8.875142E−01 | 8.875142E−01 |
| A16 | −2.018582E+00 | −2.018582E+00 | −2.018582E+00 | −2.018582E+00 | −2.018582E+00 | −2.018582E+00 | −2.018582E+00 |
| A18 | 1.721397E+00 | 1.721397E+00 | 1.721397E+00 | 1.721397E+00 | 1.721397E+00 | 1.721397E+00 | 1.721397E+00 |
| A20 | −5.750503E−01 | −5.750503E−01 | −5.750503E−01 | −5.750503E−01 | −5.750503E−01 | −5.750503E−01 | −5.750503E−01 |

Ring-shaped zone pattern, curvature radius and aspheric surface coefficient

Second surface

| | |
|---|---|
| Ring-shaped zone No. i | — |
| Starting height hs | |
| Ending height he | |
| Optical path difference m | |
| r | −1.091231 |
| κ | −4.413491E+01 |
| A0 | |
| A4 | 6.982947E−01 |
| A6 | −2.100186E+00 |
| A8 | 3.406211E+00 |
| A10 | −5.540125E+00 |
| A12 | 9.499927E+00 |
| A14 | −7.606648E+00 |
| A16 | 0.000000E+00 |
| A18 | 0.000000E+00 |
| A20 | 0.000000E+00 |

*1: Ring-shaped zone No. i,
*2: Starting height hs,
*3: Ending height he
*4: Optical path difference m Example 3

Table 4 and Table 5 show data of Example 3 for an objective lens which are suitable for the optical pickup device relating to the present embodiment.

TABLE 4

Paraxial data

| Surface No. | r(mm) | d(mm) | $N_0$ | Remarks |
|---|---|---|---|---|
| 0 | | ∞ | | Object point |
| 1 | See below | 1.89000 | 1.55923 | Objective lens |

TABLE 4-continued

Paraxial data

| Surface No. | r(mm) | d(mm) | $N_0$ | Remarks |
|---|---|---|---|---|
| 2 | See below | 0.36040 | | |
| 3 | ∞ | 0.08750 | 1.61958 | Protective layer |
| 4 | ∞ | | | |

TABLE 5

Ring-shaped zone pattern, curvature radius and aspheric surface coefficient

| | First surface | | | | | | |
|---|---|---|---|---|---|---|---|
| *1 | 1 | 2 | 3 | 4 | 5 | 6 | 7 |
| *2 | 0.000 | 0.322 | 0.445 | 0.564 | 0.673 | 0.776 | 1.032 |
| *3 | 0.322 | 0.445 | 0.564 | 0.673 | 0.776 | 1.032 | 1.092 |
| *4 | — | 4 | 4 | 4 | 4 | 4 | −4 |
| r | 0.959978 | 0.959221 | 0.958390 | 0.957291 | 0.955306 | 0.955339 | 0.979962 |
| κ | −5.833366E−01 | −5.767952E−01 | −5.797569E−01 | −5.756618E−01 | −5.722634E−01 | −5.745825E−01 | −5.644179E−01 |
| A0 | 0.000000E+00 | 2.904000E−03 | 5.812000E−03 | 8.709000E−03 | 1.150500E−02 | 1.451800E−02 | 1.656200E−02 |
| A4 | 2.060657E−02 | 2.060657E−02 | 2.146853E−02 | 2.073484E−02 | 1.932094E−02 | 2.077266E−02 | 3.291610E−02 |
| A6 | −7.089848E−03 | −7.089848E−03 | −7.089848E−03 | −7.089848E−03 | −7.089848E−03 | −7.089848E−03 | −7.089848E−03 |
| A8 | 4.307474E−02 | 4.307474E−02 | 4.307474E−02 | 4.307474E−02 | 4.307474E−02 | 4.307474E−02 | 4.307474E−02 |
| A10 | −6.305132E−02 | −6.305132E−02 | −6.305132E−02 | −6.305132E−02 | −6.305132E−02 | −6.305132E−02 | −6.305132E−02 |
| A12 | 3.474461E−02 | 3.474461E−02 | 3.474461E−02 | 3.474461E−02 | 3.474461E−02 | 3.474461E−02 | 3.474461E−02 |
| A14 | 5.864003E−02 | 5.864003E−02 | 5.864003E−02 | 5.864003E−02 | 5.864003E−02 | 5.864003E−02 | 5.864003E−02 |
| A16 | −1.125848E−01 | −1.125848E−01 | −1.125848E−01 | −1.125848E−01 | −1.125848E−01 | −1.125848E−01 | −1.125848E−01 |
| A18 | 7.353949E−02 | 7.353949E−02 | 7.353949E−02 | 7.353949E−02 | 7.353949E−02 | 7.353949E−02 | 7.353949E−02 |
| A20 | −1.771217E−02 | −1.771217E−02 | −1.771217E−02 | −1.771217E−02 | −1.771217E−02 | −1.771217E−02 | −1.771217E−02 |

| Ring-shaped zone No. i | First surface | | | | | Second surface |
|---|---|---|---|---|---|---|
| | 8 | 9 | 10 | 11 | 12 | — |
| Starting height hs | 1.092 | 1.127 | 1.150 | 1.170 | 1.188 | |
| Ending height he | 1.127 | 1.150 | 1.170 | 1.188 | 1.204 | |
| Optical path difference m | −4 | −4 | −4 | −4 | −4 | |
| r | 0.959632 | 0.959208 | 0.959677 | 0.959177 | 0.960052 | −1.300261 |
| κ | −5.796146E−01 | −5.797175E−01 | −5.784806E−01 | −5.786188E−01 | −5.736620E−01 | −3.815304E+01 |
| A0 | 8.350000E−03 | 5.283000E−03 | 2.605000E−03 | −9.190000E−04 | −3.055000E−03 | 0.000000E+00 |
| A4 | 2.405346E−02 | 2.287413E−02 | 2.173921E−02 | 2.077122E−02 | 1.934422E−02 | 5.015607E−01 |
| A6 | −7.089848E−03 | −7.089843E−03 | −7.089848E−03 | −7.089848E−03 | −7.821275E−03 | −1.396558E+00 |
| A8 | 4.307474E−02 | 4.307474E−02 | 4.307474E−02 | 4.307474E−02 | 4.307474E−02 | 2.339120E+00 |
| A10 | −6.305132E−02 | −6.305132E−02 | −6.305132E−02 | −6.305132E−02 | −6.305132E−02 | −2.744407E+00 |
| A12 | 3.474461E−02 | 3.474461E−02 | 3.474461E−02 | 3.474461E−02 | 3.474461E−02 | 1.973467E+00 |
| A14 | 5.864003E−02 | 5.864003E−02 | 5.864003E−02 | 5.864003E−02 | 5.864003E−02 | −6.382389E−01 |
| A16 | −1.125848E−01 | −1.125848E−01 | −1.125848E−01 | −1.125848E−01 | −1.125848E−01 | 3.840032E−09 |
| A18 | 7.353949E−02 | 7.353949E−02 | 7.353949E−02 | 7.353949E−02 | 7.353949E−02 | 0.000000E+00 |
| A20 | −1.771217E−02 | −1.771217E−02 | −1.771217E−02 | −1.771217E−02 | −1.771217E−02 | 0.000000E+00 |

*1: Ring-shaped zone No. i,
*2: Starting height hs,
*3: Ending height he
*4: Optical path difference m Example 4

Table 6 and Table 7 show data of Example 4 for an objective lens which is suitable for the optical pickup device relating to the present embodiment.

TABLE 6

Paraxial data

| Surface No. | r(mm) | d(mm) | $N_0$ | Remarks |
|---|---|---|---|---|
| 0 | ∞ | | | Object point |
| 1 | See below | 2.34000 | 1.55923 | Objective lens |
| 2 | See below | 0.45848 | | |
| 3 | ∞ | 0.10000 | 1.61958 | Protective layer |
| 4 | ∞ | | | |

TABLE 7

Ring-shaped zone pattern, curvature radius and aspheric surface coefficient

| | First surface | | | | | | |
|---|---|---|---|---|---|---|---|
| *1 | 1 | 2 | 3 | 4 | 5 | 6 | 7 |
| *2 | 0.000 | 0.400 | 0.560 | 0.705 | 0.840 | 0.970 | 1.290 |
| *3 | 0.400 | 0.560 | 0.705 | 0.840 | 0.970 | 1.290 | 1.365 |

TABLE 7-continued

Ring-shaped zone pattern, curvature radius and aspheric surface coefficient

| *4 | — | 5 | 5 | 5 | 5 | 5 | −5 |
|---|---|---|---|---|---|---|---|
| r | 1.190172 | 1.183589 | 1.188315 | 1.185204 | 1.188859 | 1.190424 | 1.184845 |
| κ | −6.070560E−01 | −4.806668E−01 | −5.147112E−01 | −5.053133E−01 | −4.822081E−01 | −4.804332E−01 | −4.929705E−01 |
| A0 | 0.000000E+00 | 3.635028E−03 | 7.256928E−03 | 1.075992E−02 | 1.481759E−02 | 1.887624E−02 | 1.498820E−02 |
| A4 | 1.196210E−02 | 4.165183E−03 | 6.701918E−03 | 4.713581E−03 | 6.008399E−03 | 6.851845E−03 | 3.691216E−03 |
| A6 | −1.110890E−02 | −7.940614E−03 | −6.850561E−03 | −6.575084E−03 | −8.511455E−03 | −8.580410E−03 | −6.987866E−03 |
| A8 | 1.375495E−02 | 1.375495E−02 | 1.375495E−02 | 1.375495E−02 | 1.375495E−02 | 1.375495E−02 | 1.375495E−02 |
| A10 | −1.282045E−02 | −1.282045E−02 | −1.282045E−02 | −1.282045E−02 | −1.282045E−02 | −1.282045E−02 | −1.282045E−02 |
| A12 | 3.342995E−03 | 3.342995E−03 | 3.342995E−03 | 3.342995E−03 | 3.342995E−03 | 3.342995E−03 | 3.342995E−03 |
| A14 | 4.401085E−03 | 4.401085E−03 | 4.401085E−03 | 4.401085E−03 | 4.401085E−03 | 4.401085E−03 | 4.401085E−03 |
| A16 | −4.606873E−03 | −4.606873E−03 | −4.606873E−03 | −4.606873E−03 | −4.606873E−03 | −4.606873E−03 | −4.606873E−03 |
| A18 | 1.753849E−03 | 1.753849E−03 | 1.753849E−03 | 1.753849E−03 | 1.753849E−03 | 1.753849E−03 | 1.753849E−03 |
| A20 | −2.558591E−04 | −2.558591E−04 | −2.558591E−04 | −2.558591E−04 | −2.558591E−04 | −2.558591E−04 | −2.558591E−04 |

| Ring-shaped zone No. i | First surface | | | | | Second surface |
|---|---|---|---|---|---|---|
| | 8 | 9 | 10 | 11 | 12 | |
| Starting height hs | 1.365 | 1.408 | 1.438 | 1.465 | 1.485 | — |
| Ending height he | 1.408 | 1.438 | 1.465 | 1.485 | 1.520 | |
| Optical path difference m | −5 | −5 | −5 | −5 | −5 | |
| r | 1.188369 | 1.190166 | 1.190545 | 1.189962 | 1.189750 | −1.702318 |
| κ | −4.886531E−01 | −4.880316E−01 | −4.884386E−01 | −4.875233E−01 | −4.882035E−01 | −4.240075E+01 |
| A0 | 1.062512E−02 | 5.975638E−03 | 1.154053E−03 | −7.772900E−04 | −6.409169E−03 | 0.000000E−00 |
| A4 | 5.418200E−03 | 6.021524E−03 | 6.058174E−03 | 4.644830E−03 | 4.649162E−03 | 1.976900E−01 |
| A6 | −7.770189E−03 | −7.883742E−03 | −7.883794E−03 | −7.884055E−03 | −7.884528E−03 | −2.711098E−01 |
| A8 | 1.375495E−02 | 1.375495E−02 | 1.375495E−02 | 1.375474E−02 | 1.375395E−02 | 2.155550E−01 |
| A10 | −1.282045E−02 | −1.282045E−02 | −1.282045E−02 | −1.282045E−02 | −1.282045E−02 | −1.290413E−01 |
| A12 | 3.342995E−03 | 3.342995E−03 | 3.342995E−03 | 3.342995E−03 | 3.342995E−03 | 5.923220E−02 |
| A14 | 4.401085E−03 | 4.401085E−03 | 4.401085E−03 | 4.401085E−03 | 4.401085E−03 | −1.398986E−02 |
| A16 | −4.606873E−03 | −4.606873E−03 | −4.606873E−03 | −4.606873E−03 | −4.606873E−03 | 0.000000E+00 |
| A18 | 1.753849E−03 | 1.753849E−03 | 1.753849E−03 | 1.753849E−03 | 1.753849E−03 | 0.000000E+00 |
| A20 | −2.558591E−04 | −2.558591E−04 | −2.558591E−04 | −2.558591E−04 | −2.558591E−04 | 0.000000E+00 |

*1: Ring-shaped zone No. i,
*2: Starting height hs,
*3: Ending height he
*4: Optical path difference m Example 5

Tables 8 to 11 show data of Example 5 for an objective lens which is suitable for the optical pickup device relating to the present embodiment.

TABLE 8

Paraxial data

| Surface No. | r(mm) | d(mm) | $N_0$ | Remarks |
|---|---|---|---|---|
| 0 | ∞ | | | Object point |
| 1 | See below | 2.68000 | 1.56013 | Objective lens |

TABLE 8-continued

Paraxial data

| Surface No. | r(mm) | d(mm) | $N_0$ | Remarks |
|---|---|---|---|---|
| 2 | See below | 0.70335 | | |
| 3 | ∞ | 0.08750 | 1.61958 | Protective layer |
| 4 | ∞ | | | |

TABLE 9

Ring-shaped zone pattern, curvature radius and aspheric surface coefficient

| | First surface | | | | | | |
|---|---|---|---|---|---|---|---|
| *1 | 1 | 2 | 3 | 4 | 5 | 6 | 7 |
| *2 | 0.000 | 0.255 | 0.365 | 0.450 | 0.525 | 0.595 | 0.657 |
| *3 | 0.255 | 0.365 | 0.450 | 0.525 | 0.595 | 0.657 | 0.717 |
| *4 | — | 2 | 2 | 2 | 2 | 2 | 2 |
| r | 1.467604 | 1.467082 | 1.466614 | 1.466614 | 1.466614 | 1.465113 | 1.464596 |
| κ | −6.659049E−01 | −6.678193E−01 | −6.664348E−01 | −6.664348E−01 | −6.664348E−01 | −6.649780E−01 | −6.647369E−01 |
| A0 | 0.000000E+00 | 1.446388E−03 | 2.893248E−03 | 4.340443E−03 | 5.786923E−03 | 7.232972E−03 | 8.679134E−03 |
| A4 | 8.928603E−03 | 8.928603E−03 | 8.928603E−03 | 8.928603E−03 | 8.928603E−03 | 8.928603E−03 | 8.928603E−03 |
| A6 | 4.622400E−04 | 4.622400E−04 | 4.622400E−04 | 4.622400E−04 | 4.622400E−04 | 4.622400E−04 | 4.622400E−04 |

TABLE 9-continued

Ring-shaped zone pattern, curvature radius and aspheric surface coefficient

| | | | | | | | |
|---|---|---|---|---|---|---|---|
| A8  | 1.543793E−03  | 1.543793E−03  | 1.543793E−03  | 1.543793E−03  | 1.543793E−03  | 1.543793E−03  | 1.543793E−03 |
| A10 | −9.613639E−04 | −9.613639E−04 | −9.613639E−04 | −9.613639E−04 | −9.613639E−04 | −9.613639E−04 | −9.613639E−04 |
| A12 | 2.631724E−04  | 2.631724E−04  | 2.631724E−04  | 2.631724E−04  | 2.631724E−04  | 2.631724E−04  | 2.631724E−04 |
| A14 | 1.924450E−04  | 1.924450E−04  | 1.924450E−04  | 1.924450E−04  | 1.924450E−04  | 1.924450E−04  | 1.924450E−04 |
| A16 | −1.655520E−04 | −1.655520E−04 | −1.655520E−04 | −1.655520E−04 | −1.655520E−04 | −1.655520E−04 | −1.655520E−04 |
| A18 | 4.783881E−05  | 4.783881E−05  | 4.783881E−05  | 4.783881E−05  | 4.783881E−05  | 4.783881E−05  | 4.783881E−05 |
| A20 | −4.983895E−06 | −4.983895E−06 | −4.983895E−06 | −4.983895E−06 | −4.983895E−06 | −4.983895E−06 | −4.983895E−06 |

First surface

| *1 | 8 | 9 | 10 | 11 | 12 | 13 | 14 |
|---|---|---|---|---|---|---|---|
| *2 | 0.717 | 0.774 | 0.822 | 0.874 | 0.923 | 0.970 | 1.021 |
| *3 | 0.774 | 0.822 | 0.874 | 0.923 | 0.970 | 1.021 | 1.070 |
| *4 | 2 | 2 | 2 | 2 | 2 | 2 | 2 |
| r | 1.464596 | 1.466163 | 1.466163 | 1.466163 | 1.466148 | 1.466148 | 1.466148 |
| κ | −6.647369E−01 | −6.526380E−01 | −6.526380E−01 | −6.526380E−01 | −6.500408E−01 | −6.500408E−01 | −6.500408E−01 |
| A0 | 1.012630E−02 | 1.178169E−02 | 1.329306E−02 | 1.485241E−02 | 1.638253E−02 | 1.792474E−02 | 1.947529E−02 |
| A4 | 8.928603E−03 | 8.928603E−03 | 8.928603E−03 | 8.928603E−03 | 8.928603E−03 | 8.928603E−03 | 8.928603E−03 |
| A6 | 4.622400E−04 | 4.622400E−04 | 4.622400E−04 | 4.622400E−04 | 4.622400E−04 | 4.622400E−04 | 4.622400E−04 |
| A8 | 1.543793E−03 | 1.543793E−03 | 1.543793E−03 | 1.543793E−03 | 1.543793E−03 | 1.543793E−03 | 1.543793E−03 |
| A10 | −9.613639E−04 | −9.613639E−04 | −9.613639E−04 | −9.613639E−04 | −9.613639E−04 | −9.613639E−04 | −9.613639E−04 |
| A12 | 2.631724E−04 | 2.631724E−04 | 2.631724E−04 | 2.631724E−04 | 2.631724E−04 | 2.631724E−04 | 2.631724E−04 |
| A14 | 1.924450E−04 | 1.924450E−04 | 1.924450E−04 | 1.924450E−04 | 1.924450E−04 | 1.924450E−04 | 1.924450E−04 |
| A16 | −1.655520E−04 | −1.655520E−04 | −1.655520E−04 | −1.655520E−04 | −1.655520E−04 | −1.655520E−04 | −1.655520E−04 |
| A18 | 4.783881E−05 | 4.783881E−05 | 4.783881E−05 | 4.783881E−05 | 4.783881E−05 | 4.783881E−05 | 4.783881E−05 |
| A20 | −4.983895E−06 | −4.983895E−06 | −4.983895E−06 | −4.983895E−06 | −4.983895E−06 | −4.983895E−06 | −4.983895E−06 |

*1: Ring-shaped zone No. i,
*2: Starting height hs,
*3: Ending height he
*4: Optical path difference m

TABLE 10

Ring-shaped zone pattern, curvature radius and aspheric surface coefficient

First surface

| *1 | 15 | 16 | 17 | 18 | 19 | 20 | 21 |
|---|---|---|---|---|---|---|---|
| *2 | 1.070 | 1.126 | 1.187 | 1.250 | 1.328 | 1.550 | 1.631 |
| *3 | 1.126 | 1.187 | 1.250 | 1.328 | 1.550 | 1.631 | 1.688 |
| *4 | 2 | 2 | 2 | 2 | −4 | −4 | −4 |
| r | 1.467588 | 1.467588 | 1.467588 | 1.465244 | 1.462893 | 1.462893 | 1.464419 |
| κ | −6.452045E−01 | −6.452045E−01 | −6.452045E−01 | −6.566940E−01 | −6.529149E−01 | −6.529149E−01 | −6.557399E−01 |
| A0 | 2.137046E−02 | 2.264016E−02 | 2.424404E−02 | 2.573344E−02 | 2.705133E−02 | 2.437669E−02 | 2.143435E−02 |
| A4 | 8.928603E−03 | 8.928603E−03 | 8.928603E−03 | 9.388801E−03 | 8.928603E−03 | 8.928603E−03 | 8.928603E−03 |
| A6 | 4.622400E−04 | 4.622400E−04 | 4.622400E−04 | 4.622400E−04 | 4.622400E−04 | 4.622400E−04 | 4.622400E−04 |
| A8 | 1.543793E−03 | 1.543793E−03 | 1.543793E−03 | 1.543793E−03 | 1.543793E−03 | 1.543793E−03 | 1.543793E−03 |
| A10 | −9.613639E−04 | −9.613639E−04 | −9.613639E−04 | −9.613639E−04 | −9.613639E−04 | −9.613639E−04 | −9.613639E−04 |
| A12 | 2.631724E−04 | 2.631724E−04 | 2.631724E−04 | 2.631724E−04 | 2.631724E−04 | 2.631724E−04 | 2.631724E−04 |
| A14 | 1.924450E−04 | 1.924450E−04 | 1.924450E−04 | 1.924450E−04 | 1.924450E−04 | 1.924450E−04 | 1.924450E−04 |
| A16 | −1.655520E−04 | −1.655520E−04 | −1.655520E−04 | −1.655520E−04 | −1.655520E−04 | −1.655520E−04 | −1.655520E−04 |
| A18 | 4.783881E−05 | 4.783881E−05 | 4.783881E−05 | 4.783881E−05 | 4.783881E−05 | 4.783881E−05 | 4.783881E−05 |
| A20 | −4.983895E−06 | −4.983895E−06 | −4.983895E−06 | −4.983895E−06 | −4.983895E−06 | −4.983895E−06 | −4.983895E−06 |

First surface

| *1 | 22 | 23 | 24 | 25 | 26 | 27 | 28 |
|---|---|---|---|---|---|---|---|
| *2 | 1.688 | 1.729 | 1.759 | 1.783 | 1.802 | 1.819 | 1.834 |
| *3 | 1.729 | 1.759 | 1.783 | 1.802 | 1.819 | 1.834 | 1.900 |
| *4 | −4 | −4 | −4 | −4 | −4 | −4 | −4 |
| r | 1.464826 | 1.464826 | 1.464826 | 1.467608 | 1.467741 | 1.467741 | 1.467741 |
| κ | −6.575672E−01 | −6.575672E−01 | −6.575672E−01 | −6.615885E−01 | −6.633480E−01 | −6.633480E−01 | −6.633480E−01 |
| A0 | 1.852396E−02 | 1.675013E−02 | 1.346548E−02 | 1.071251E−02 | 7.505943E−03 | 4.062772E−03 | 3.274025E−04 |
| A4 | 8.928603E−03 | 8.928603E−03 | 8.928603E−03 | 8.928603E−03 | 8.928603E−03 | 8.928603E−03 | 8.928603E−03 |
| A6 | 4.622400E−04 | 4.622400E−04 | 4.622400E−04 | 4.622400E−04 | 4.622400E−04 | 4.622400E−04 | 4.622400E−04 |
| A8 | 1.543793E−03 | 1.543793E−03 | 1.543793E−03 | 1.543793E−03 | 1.543793E−03 | 1.543793E−03 | 1.543793E−03 |
| A10 | −9.613639E−04 | −9.613639E−04 | −9.613639E−04 | −9.613639E−04 | −9.613639E−04 | −9.613639E−04 | −9.613639E−04 |
| A12 | 2.631724E−04 | 2.631724E−04 | 2.631724E−04 | 2.631724E−04 | 2.631724E−04 | 2.631724E−04 | 2.631724E−04 |
| A14 | 1.924450E−04 | 1.924450E−04 | 1.924450E−04 | 1.924450E−04 | 1.924450E−04 | 1.924450E−04 | 1.924450E−04 |
| A16 | −1.655520E−04 | −1.655520E−04 | −1.655520E−04 | −1.655520E−04 | −1.655520E−04 | −1.655520E−04 | −1.655520E−04 |

TABLE 10-continued

| Ring-shaped zone pattern, curvature radius and aspheric surface coefficient | | | | | | | |
|---|---|---|---|---|---|---|---|
| A18 | 4.783881E−05 | 4.783881E−05 | 4.783881E−05 | 4.783881E−05 | 4.783881E−05 | 4.783881E−05 | 4.783881E−05 |
| A20 | −4.983895E−06 | −4.983895E−06 | −4.983895E−06 | −4.983895E−06 | −4.983895E−06 | −4.983895E−06 | −4.983895E−06 |

*1: Ring-shaped zone No. i,
*2: Starting height hs,
*3: Ending height he
*4: Optical path, difference m

TABLE 11

| | Second surface |
|---|---|
| Ring-shaped zone No. i | — |
| Starting height hs | |
| Ending height he | |
| Optical path difference m | |
| r | −2.642881 |
| κ | −5.037984E+01 |
| A0 | 0.000000E+00 |
| A4 | 9.363533E−02 |
| A6 | −9.232430E−02 |
| A8 | 7.196670E−02 |
| A10 | −4.219412E−02 |
| A12 | 1.394635E−02 |
| A14 | −1.889003E−03 |
| A16 | 0.000000E+00 |
| A18 | 0.000000E+00 |
| A20 | 0.000000E+00 |

Table 12 collectively shows values of expressions relating to Examples 1 to 5.

TABLE 12

| Examples | 1 | 2 | 3 | 4 | 5 | Remarks |
|---|---|---|---|---|---|---|
| Design reference wavelength [nm] | 407.5 | 405 | 405 | 405 | 405 | |
| Design reference temperature [° C.] | 25 | 25 | 25 | 25 | 25 | |
| Numerical aperture: NA | 0.85 | 0.85 | 0.85 | 0.85 | 0.85 | |
| Effective aperture of the first surface [mm] | 1.7 | 2 | 2.4 | 3 | 3.74 | |
| Focal length: f [mm] | 1.000 | 1.176 | 1.412 | 1.765 | 2.200 | |
| Magnification | 0 | 0 | 0 | 0 | 0 | |
| Number of ring-shaped zones: M | 7 | 7 | 12 | 12 | 28 | |
| δSA3 [λrms] caused by temperature change | 0.026 | 0.028 | 0.033 | 0.057 | 0.074 | δT = +30° C., δλ/δT = +0.05 nm/° C. |
| δSA3 [λrms] caused by wavelength change | −0.040 | −0.054 | −0.069 | −0.082 | −0.108 | δλ = +5 nm |
| δSAT/f[λrms/(° C. · mm)] | 0.00086 | 0.00080 | 0.00079 | 0.00107 | 0.00112 | |
| δSAλ/f[λrms/(nm · mm)] | −0.00804 | −0.00913 | −0.00982 | −0.00933 | −0.00985 | |
| Working distance WD [mm] | 0.203 | 0.295 | 0.360 | 0.458 | 0.703 | |
| Axial thickness: d [mm] | 1.440 | 1.570 | 1.890 | 2.340 | 2.680 | |
| Order (Average in effective diameters): m | 4.00 | 5.00 | 4.00 | 5.00 | 2.30 | |
| d/f | 1.440 | 1.335 | 1.339 | 1.326 | 1.218 | |
| $(m \cdot M)/(f \cdot NA^4)$ | 53.6 | 57.0 | 65.1 | 65.1 | 56.1 | |

The invention claimed is:

1. An objective lens for use in an optical pickup device comprising a light source emitting a light flux with a wavelength of 450 nm or lower, and a light-converging optical system including an objective lens for converging the light flux emitted by the light source onto an information recording surface of an optical information recording medium, the optical pickup device being capable of recording and/or reproducing information when the light converging optical system converges the light flux from the light source onto the information recording surface of the optical information recording medium, the objective lens comprising:

a single lens body made with a plastic, and
a ring-shaped structure arranged on at least one optical surface of the objective lens and including ring-shaped zones which are three or more and thirty or less in number and are formed such that adjoining ring-shaped zones cause a predetermined optical path difference for an incident light flux,
wherein the ring-shaped structure is formed as a turning structure comprising steps whose directions change at least once within an effective aperture of the objective lens, such that the depths of the steps become deeper in an area up to a predetermined height along a perpendicular direction to the optical axis, and the depths of the steps become shallower in an area away from the predetermined height, and
the objective lens satisfies the following expressions:

$$NA \geq 0.8 \quad (1)$$

$$2.2 \geq f(mm) \geq 0.9 \quad (2)$$

$$0 \leq \delta SAT/f(\lambda rms/° C. \cdot mm) \leq 0.0015 \quad (3)$$

$$-0.012 \leq \delta SA\lambda/f(\lambda rms/nm \cdot mm) \leq -0.00804 \quad (4)$$

$$WD (mm) \geq 0.25 \quad (5)$$

where NA is an image side numerical aperture of the objective lens required for recording and/or reproducing information for the optical information recording medium, f (mm) is a focal length of the objective lens, δSAT (λrms/° C.) is a change rate of a third order spherical aberration of the objective lens caused by a temperature change (δSA3/δT), and δSAλ(λrms/nm) is a change rate of a third order spherical aberration of the objective lens caused by a wavelength change ($\delta SA3/\delta\lambda$, and WD (mm) is a working distance of the objective lens, and wherein the objective lens suppresses generation of a spherical aberration, even if a temperature change arises, by sacrificing wavelength characteristics to satisfy the expression (4) and by enhancing temperature characteristics to satisfy the expression (3), wherein $\delta SAT$ is measured or calculated under a condition that a change rate of a wavelength of an incident light flux entering the objective lens caused by a temperature change is +0.05 nm/° C., and a sign of the third spherical aberration in $\delta SAT$ and $\delta SA\lambda$ is defined as "positive" for a change in an over-corrected direction and as "negative" for a change in an under-corrected direction.

2. The objective lens of claim 1, wherein the directions of the steps change at any one of the ring-shaped zones formed within an area which covers 60% to 80% of height of the effective aperture, on the optical surface including the ring-shaped structure.

3. The objective lens of claim 1, wherein when a light flux with a wavelength which is a design reference wavelength $\lambda_0$ (nm) of the objective lens enters the objective lens, each step causes the optical path difference represented by m=INT(X), and an absolute value of m is a natural number being two or more at a step formed at a position being away toward an outside along a perpendicular direction to an optical axis from a ring-shaped zone where the directions of the steps change, where X satisfies $X=\Delta \cdot (N_0-1)/(\lambda_0 \cdot 10^{-3})$, INT(X) represents an integer obtained by rounding X, $\Delta(\mu m)$ is a depth of the step and is defined as "positive" when one of the adjoining ring-shaped zones on a side being away from the optical axis displaces toward the optical information recording medium compared with the other of the adjoining ring-shaped zones on a side being closer to the optical axis, and is defined as "negative" when one of the adjoining ring-shaped zones on the side being away from the optical axis displaces away from the optical information recording medium compared with the other of the adjoining ring-shaped zones on the side being closer to the optical axis, and $N_0$ is a refractive index of the objective lens at the design reference wavelength $\lambda_0$ (nm).

4. The objective lens of claim 1, wherein each of the ring-shaped zones has an aspheric shape represented by a function in a same style in the ring-shaped structure, and at least two of the ring-shaped zones have different aspheric surface coefficients from each other.

5. The objective lens of claim 1, wherein the objective lens satisfies the following expression:

$$40 \leq (m \cdot M)/(f \cdot NA^4) \leq 80,$$

where m is a mean of absolute values of diffraction orders of diffracted light fluxes generated by the ring-shaped structure within the effective aperture of the objective lens, and M is a total number of the ring-shape zones of the ring-shaped structure formed within the effective aperture of the objective lens.

6. The objective lens of claim 1, wherein a total number of the ring-shape zones is 5 or more, and 20 or less.

7. The objective lens of claim 1, wherein the objective lens satisfies the following expression:

$$1.0 < d/f \leq 1.7,$$

where d (mm) is a thickness of the objective lens along an optical axis.

8. The objective lens of claim 1, wherein the light flux enters the objective lens as parallel light flux.

9. An optical pickup device on which the objective lens of claim 1 is mounted, the optical pickup device comprising:

a light source emitting a light flux with a wavelength of 450 nm or lower; and a light converging optical system including the objective lens, for converging the light flux emitted by the light source onto an information recording surface of an optical information recording medium, wherein the optical pickup device is capable of recording and/or reproducing information when the light converging optical system converges the light flux from the light source onto the information recording surface of the optical information recording medium.

10. The optical pickup device of claim 9, further comprising:

a mechanism which corrects a spherical aberration caused on the objective lens, the spherical aberration being caused by a change of the wavelength of the light flux emitted from the light source.

* * * * *